(12) United States Patent
Moriya et al.

(10) Patent No.: US 8,120,740 B2
(45) Date of Patent: Feb. 21, 2012

(54) ACTIVE-MATRIX SUBSTRATE AND METHOD FOR PRODUCING THE SAME, ELECTROOPTICAL DEVICE AND METHOD FOR PRODUCING THE SAME, AND ELECTRONIC APPARATUS

(75) Inventors: Soichi Moriya, Chino (JP); Takeo Kawase, Suwa (JP); Tsutomu Miyamoto, Shiojiri (JP); Kiyoshi Nakamura, Suwa (JP)

(73) Assignee: Seiko Epson Corporation (JP)

( * ) Notice: Subject to any disclaimer, the term of this patent is extended or adjusted under 35 U.S.C. 154(b) by 707 days.

(21) Appl. No.: 12/108,609

(22) Filed: Apr. 24, 2008

(65) Prior Publication Data

US 2008/0266514 A1  Oct. 30, 2008

(30) Foreign Application Priority Data

Apr. 25, 2007  (JP) ................. 2007-115391

(51) Int. Cl.
*G02F 1/1345* (2006.01)
*G02F 1/13* (2006.01)

(52) U.S. Cl. ...................................... 349/149

(58) Field of Classification Search .................. 349/149, 349/192
See application file for complete search history.

(56) References Cited

U.S. PATENT DOCUMENTS

| 4,925,774 A | * | 5/1990 | Barraud et al. | 430/296 |
| 5,782,665 A | * | 7/1998 | Weisfield et al. | 445/24 |
| 6,400,425 B1 | * | 6/2002 | Kim et al. | 349/40 |
| 2005/0140890 A1 | * | 6/2005 | Kim et al. | 349/139 |

FOREIGN PATENT DOCUMENTS

JP  2006-041180  9/2006

* cited by examiner

*Primary Examiner* — David Nelms
*Assistant Examiner* — David Chung
(74) *Attorney, Agent, or Firm* — Harness, Dickey & Pierce, P.L.C.

(57) ABSTRACT

A method for producing an active-matrix substrate including a board, pixels, thin-film transistors that switch the pixels, and source lines and gate lines electrically connected to the thin-film transistors includes forming a conduction portion that provides electrical connection between the source lines and the gate lines using an organic conductive material at the same time as forming either the source lines or the gate lines; and breaking the electrical connection provided by the conduction portion.

6 Claims, 14 Drawing Sheets

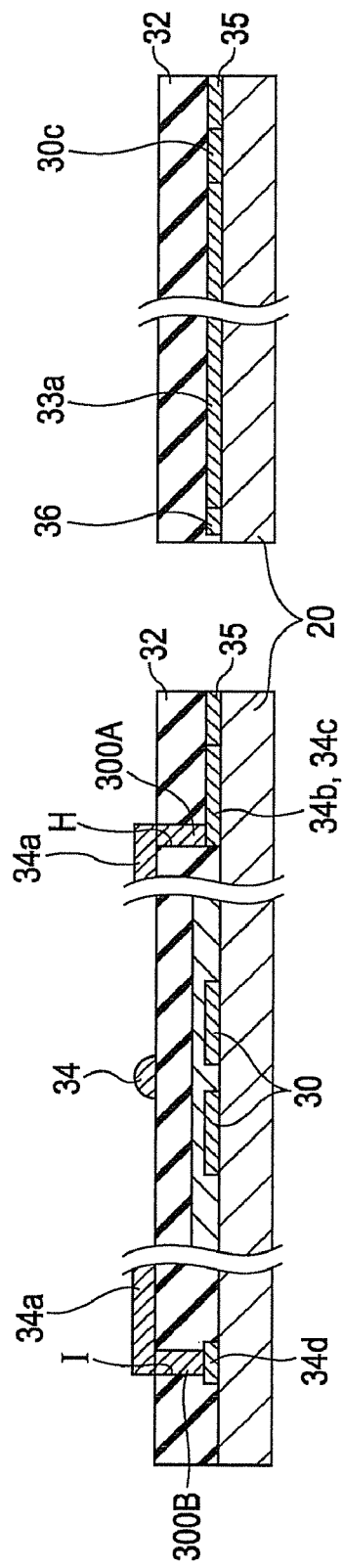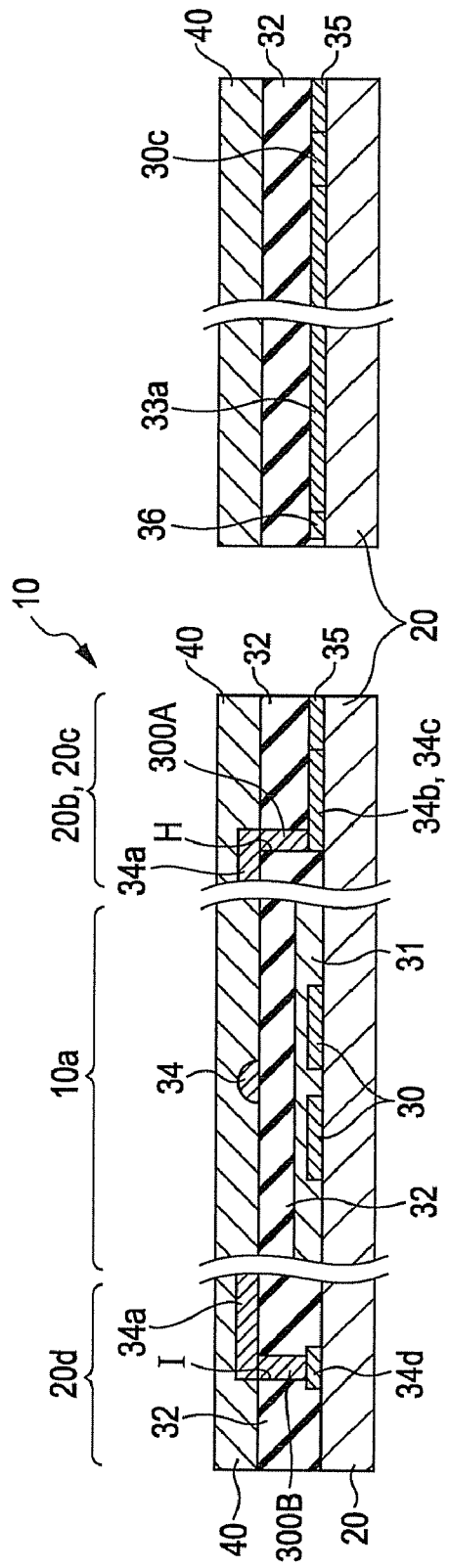

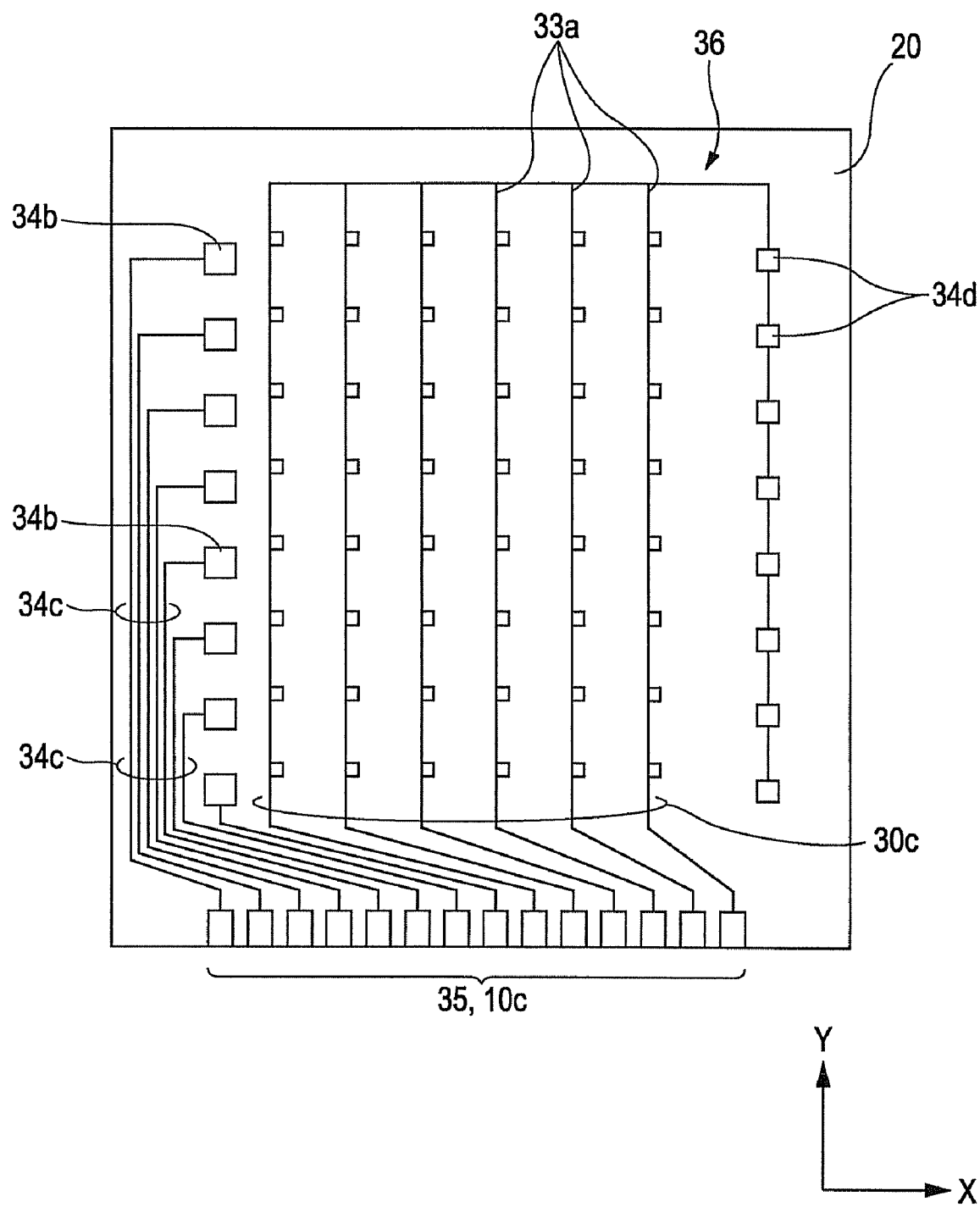

ACTIVE-MATRIX SUBSTRATE AND METHOD FOR PRODUCING THE SAME, ELECTROOPTICAL DEVICE AND METHOD FOR PRODUCING THE SAME, AND ELECTRONIC APPARATUS

BACKGROUND

1. Technical Field

The present invention relates to active-matrix substrates and methods for producing the substrates, electrooptical devices and methods for producing the devices, and electronic apparatuses.

2. Related Art

Organic transistors, particularly, organic semiconductor layers and gate insulating layers, are currently formed by a low-cost liquid-phase process such as printing, as typified by ink jetting, or spin coating. JP-A-2006-41180 discusses an example of such a method for producing an organic transistor.

An organic thin-film transistor formed on a flexible plastic board, however, has the problem that it can be damaged by static electricity acquired during its production process and can no longer function as a transistor.

Plastic materials, frequently used for flexible boards, have a tendency to acquire static electricity due to their superior insulating properties. This static electricity imposes high voltage on the transistor, thus causing electrostatic damage (dielectric breakdown). Another reason is that an organic thin-film transistor has a lower breakdown voltage than an inorganic transistor because it includes a gap insulating layer formed of a polymer.

SUMMARY

An advantage of some aspects of the invention is that it provides an active-matrix substrate and a method for producing the substrate, an electrooptical device and a method for producing the device, and an electronic apparatus with appropriate measures against static electricity.

A method according to a first aspect of the invention for producing an active-matrix substrate including a board, pixels, thin-film transistors that switch the pixels, and source lines and gate lines electrically connected to the thin-film transistors includes forming a conduction portion that provides electrical connection between the source lines and the gate lines using an organic conductive material at the same time as forming either the source lines or the gate lines; and breaking the electrical connection provided by the conduction portion.

In the method for producing the active-matrix substrate according to the first aspect of the invention, no electric field occurs between the source lines and the gate lines because the conduction portion allows them to be equipotential. This prevents dielectric breakdown between the source lines and the gate lines due to static electricity. In addition, the electrical connection between the source lines and the gate lines is broken without the risk of static electricity, so that the active-matrix substrate can provide a desired function.

If the conduction portion is formed of an organic conductive material, the electrical connection provided by the conduction portion can be broken not only by a physical method, but also by a chemical method, as described in detail below. This allows the electrical connection between the source lines and the gate lines to be readily and reliably broken.

It is preferable that the conduction portion be formed by printing.

With printing, the conduction portion can be formed at low cost.

It is preferable that the electrical connection be broken by dissolving and removing at least part of the conduction portion using an organic solvent.

Using the organic solvent to dissolve and remove at least part of the conduction portion allows the electrical connection between the source lines and the gate lines to be readily and reliably broken without damaging, for example, the board.

A method according to a second aspect of the invention for producing an active-matrix substrate including a board including a conductive portion, pixels, thin-film transistors that switch the pixels, and source lines and gate lines electrically connected to the thin-film transistors includes forming an insulating layer on the board; forming the source lines and the gate lines on the insulating layer; electrically connecting the source lines and the gate lines to the conductive portion through contact portions; and breaking the electrical connection between the source lines and the gate lines.

In the method for producing the active-matrix substrate according to the second aspect of the invention, no electric field occurs between the source lines and the gate lines because they are electrically connected to the conductive portion of the board so that they become equipotential. This prevents dielectric breakdown between the source lines and the gate lines due to static electricity. In addition, because the conductive portion is provided in the board, used as a component of the active-matrix substrate, electrical connection can readily be made between the source lines and the gate lines without forming extra wiring, for example, on the board.

Furthermore, the electrical connection between the source lines and the gate lines is broken without the risk of static electricity affecting the pixels, so that the active-matrix substrate can provide a desired function. If the conductive portion is formed of an organic conductive material, the electrical connection between the source lines and the gate lines can be broken not only by a physical method, but also by a chemical method, as described in detail below. This allows the electrical connection between the source lines and the gate lines to be readily and reliably broken.

An active-matrix substrate according to a third aspect of the invention includes a board, pixels, thin-film transistors that switch the pixels, source lines and gate lines electrically connected to the thin-film transistors, and a connective portion that couples the source lines and the gate lines together. The connective portion is provided by converting a conductor into an insulator.

The active-matrix substrate according to the third aspect of the invention can be produced with the source lines and the gate lines being equipotential because the connective portion provides electrical connection between the source lines and the gate lines during the production process. That is, no electric field occurs between the source lines and the gate lines during the production process. This prevents dielectric breakdown between the source lines and the gate lines due to static electricity. The connective portion is then converted into an insulator, and the electrical connection between the source lines and the gate lines is broken accordingly, before the active-matrix substrate is finished.

An active-matrix substrate according to a fourth aspect of the invention includes a board, pixels, thin-film transistors that switch the pixels, source lines and gate lines electrically connected to the thin-film transistors, a conduction portion that provides electrical connection between the source lines and the gate lines, and a breaking portion provided in the conduction portion to break the electrical connection between the source lines and the gate lines.

In the active-matrix substrate according to the fourth aspect of the invention, no electric field occurs between the source lines and the gate lines during its production process because the conduction portion provides electrical connection between the source lines and the gate lines so that they become equipotential. This prevents dielectric breakdown between the source lines and the gate lines due to static electricity.

According to the fourth aspect of the invention, additionally, the breaking portion provided in the conduction portion breaks the electrical connection between the source lines and the gate lines, so that they can be supplied with image signals and scanning signals, respectively. As a result, the active-matrix substrate can provide a desired function. Thus, a highly reliable active-matrix substrate capable of preventing dielectric breakdown due to static electricity can be provided.

It is preferable that the conduction portion be formed of an organic conductive material.

If the conduction portion is formed of an organic conductive material, the breaking portion can readily be formed by, for example, dissolving the conduction portion using an organic solvent. The breaking portion, formed by such a method, functions to reliably break the electrical connection between the source lines and the gate lines, thus ensuring the functions of the source lines and the gate lines on the active-matrix substrate.

An active-matrix substrate according to a fifth aspect of the invention includes a board including a conductive portion, an insulating layer on the board, pixels on the insulating layer, thin-film transistors that switch the pixels, source lines and gate lines disposed on the insulating layer and electrically connected to the thin-film transistors, contact portions disposed in the insulating layer to provide electrical connection between the source lines and the gate lines through the conductive portion, and a breaking portion that breaks the electrical connection between the source lines and the gate lines.

In the active-matrix substrate according to the fifth aspect of the invention, no electric field occurs between the source lines and the gate lines during its production process because the conductive portion of the board and the contact portions provide electrical connection between the source lines and the gate lines so that they become equipotential. This prevents dielectric breakdown between the source lines and the gate lines due to static electricity.

In addition, because the conductive portion is provided in the board, it eliminates the need to form extra wiring for providing electrical connection between the source lines and the gate lines on the board, thus simplifying the structure of the active-matrix substrate.

According to the fifth aspect of the invention, additionally, the breaking portion reliably breaks the electrical connection between the source lines and the gate lines, so that they can be supplied with image signals and scanning signals, respectively. As a result, the active-matrix substrate can provide a desired function. Thus, a highly reliable active-matrix substrate capable of preventing dielectric breakdown due to static electricity can be provided.

It is preferable that a method for producing an electrooptical device include laminating the active-matrix substrate produced by one of the above methods and a counter substrate with an electrooptical material disposed therebetween.

This method uses the active-matrix substrate in which the electrical connection between the source lines and the gate lines has been broken in advance, thus eliminating the need to break the electrical connection between the source lines and the gate lines after assembling the display element. While it is often difficult to break the electrical connection between the source lines and the gate lines after assembling the display element, it is easy to break the electrical connection before assembling the display element, thus improving yield.

A method according to a sixth aspect of the invention for producing an electrooptical device including an active-matrix substrate and a counter substrate with an electrooptical material disposed therebetween includes laminating the active-matrix substrate and the counter substrate with the electrooptical material disposed therebetween to form a display element. The active-matrix substrate includes a conduction portion that provides electrical connection between source lines and gate lines. This method further includes breaking the electrical connection between the source lines and the gate lines.

In the method for producing the electrooptical device according to the seventh aspect of the invention, no electric field occurs between the source lines and the gate lines even if static electricity occurs during the assembly of the display element, because the electrical connection between the source lines and the gate lines is broken after the assembly of the display element. This prevents dielectric breakdown between the source lines and the gate lines due to static electricity, thus providing a highly reliable electrooptical device.

It is preferable that the conduction portion be formed of an organic conductive material and that the electrical connection between the source lines and the gate lines be broken by dissolving and removing at least part of the conduction portion using an organic solvent.

According to this method, at least part of the conduction portion can readily be dissolved and removed using the organic solvent without damaging, for example, the board because the conduction portion is formed of an organic conductive material.

It is also preferable that the electrical connection between the source lines and the gate lines be broken by eliminating conductivity from at least part of the conduction portion.

According to this method, at least part of the conduction portion can be modified to eliminate conductivity, thereby breaking the electrical connection between the source lines and the gate lines. For example, at least part of the conduction portion can be oxidized and degraded using a chemical solution to eliminate conductivity.

It is also preferable that the electrical connection between the source lines and the gate lines be broken by eliminating conductivity by light irradiation.

According to this method, the light irradiation induces a ring-opening or oxidation reaction of a conjugated portion responsible for the conductivity of the organic material constituting the conduction portion, thereby eliminating conductivity.

It is preferable that the board be a multiple mother board and that the electrical connection between the source lines and the gate lines be broken by cutting the conduction portion at the same time as cutting the mother board into pieces.

According to this method, the electrical connection between the source lines and the gate lines can be broken at the same time as cutting the mother board into a plurality of electrooptical devices, thus reducing the number of operational steps for higher yield.

It is preferable that an electrooptical device include a display element including one of the above active-matrix substrates, a counter substrate, and an electrooptical material disposed therebetween.

In the display element, included in the electrooptical device, the conduction portion provides electrical connection between the source lines and the gate lines. The electrooptical device therefore has a low possibility of electrostatic damage to the pixels during its production process, thus causing few pixel defects.

It is preferable that an electronic apparatus include the above electrooptical device.

The electrooptical device, included in the electronic apparatus, has a low possibility of electrostatic damage to the pixels, thus causing few pixel defects. With the electrooptical device, therefore, the electronic apparatus can provide superior display characteristics.

BRIEF DESCRIPTION OF THE DRAWINGS

The invention will be described with reference to the accompanying drawings, wherein like numbers reference like elements.

FIG. 6A is a diagram illustrating a step following the step of FIGS. 5A to 5C.

FIG. 6B is a diagram illustrating the same step.

FIG. 7 is a plan view of a circuit board during its production process.

DESCRIPTION OF EXEMPLARY EMBODIMENTS

Figure 1:
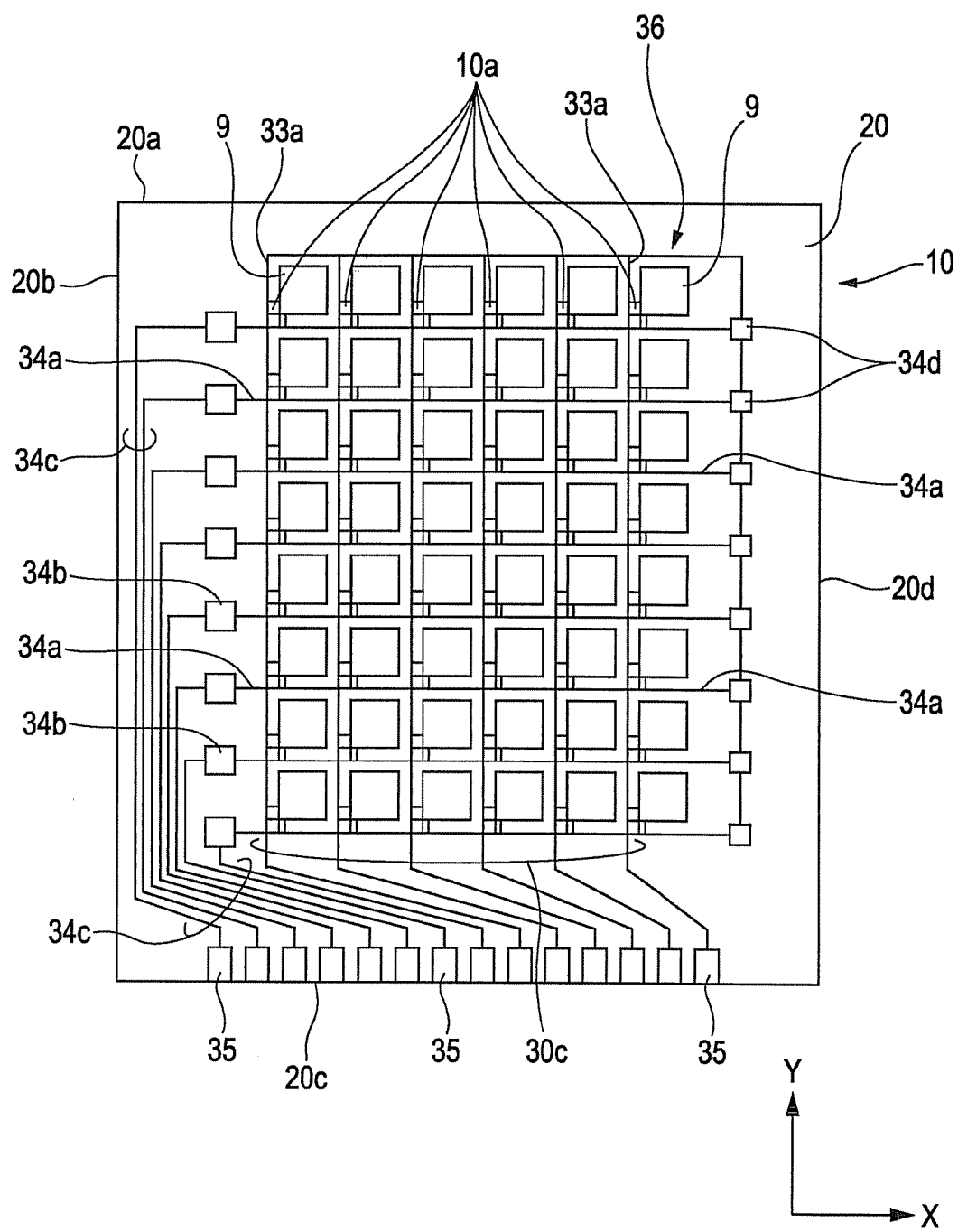
FIG. 1 is a plan view of an active-matrix substrate according to a first embodiment of the invention.

The invention will now be described in detail with reference to the drawings.

The embodiments shown below are merely examples of the invention and should not be construed as limiting the invention; any modification is permitted within the technical scope of the invention. The drawings below illustrate layers and components on different scales so that they have a recognizable size in the drawings.

Active-Matrix Substrate

Figure 2A:
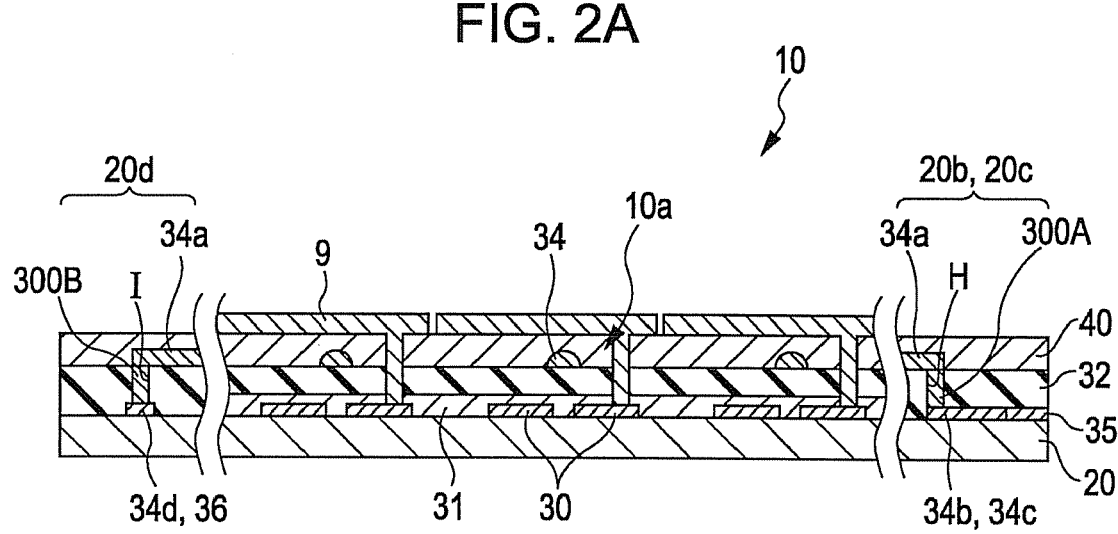
FIG. 2A is a sectional view taken along a gate line shown in FIG. 1.
Figure 2B:
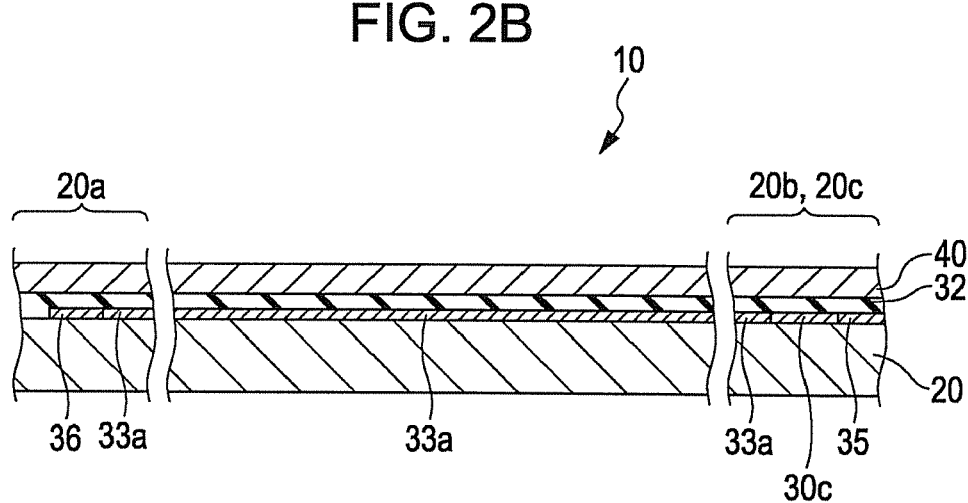
FIG. 2B is a sectional view taken along a source line shown in FIG. 1.

FIG. 1 is a diagram of an active-matrix substrate for use in a method for producing an electrooptical device according to an embodiment of the invention. FIG. 2A is a sectional view taken along a gate line shown in FIG. 1, and FIG. 2B is a sectional view taken along a source line shown in FIG. 1.

This active-matrix substrate is suitable for use in, for example, an electrophoretic display.

Referring to FIG. 1, an active-matrix substrate 10 includes a flexible board 20 that is rectangular in plan view and that is formed of, for example, polycarbonate, pixel electrodes 9 arranged in a matrix in plan view in substantially the center of the board 20, and organic thin-film transistors 10a corresponding to the individual pixel electrodes 9 and functioning as switching elements. The organic thin-film transistors 10a are electrically connected to gate lines 34a and source lines 33a extending in two orthogonal directions across the flexible board 20.

First gate-line connecting portions 34b are arranged in a peripheral region 20b of the active-matrix substrate 10 along its long side and are connected to ends of the gate lines 34a. Second gate-line connecting portions 34d are arranged in the opposing peripheral region 20d of the active-matrix substrate 10 along its long side and are connected to the other ends of the gate lines 34a. The first gate-line connecting portions 34b and the source lines 33a are connected to external connection terminals 35 through gate-line leads 34c and source-line leads 30c, respectively. The external connection terminals 35 are arranged in a peripheral region 20c of the active-matrix substrate 10 along its short side.

The active-matrix substrate 10 according to this embodiment further includes a conduction line (conduction portion) 36 for providing electrical connection between the gate lines 34a and the source lines 33a. The conduction line 36 extends across a peripheral region 20a of the active-matrix substrate 10 along its short side and the peripheral region 20d of the active-matrix substrate 10 along its long side. The conduction line 36 is disposed on the same surface as the source lines 33a and the second gate-line connecting portions 34d so as to connect all the source lines 33a and the second gate-line connecting portions 34d together. The conduction line 36 is formed of an organic conductive material, as described later.

Referring to FIG. 2A, the active-matrix substrate 10 includes the board 20; the gate-line connecting portions 34b, which are disposed on the board 20 and are connected to gate electrodes to be described later; an insulating layer (interlayer film) 32 disposed over the gate-line connecting portions 34b; and the gate lines 34a, which are disposed on the insulating layer 32.

The insulating layer 32 disposed over the gate-line connecting portions 34b has contact holes H in which a conductive material is embedded to form contact portions 300A and contact holes I in which a conductive material is embedded to form contact portions 300B.

The gate electrodes 34 are connected to the first gate-line connecting portions 34b through the gate lines 34a and the contact portions 300A and are connected to the second gate-line connecting portions 34d through the gate lines 34a and the contact portions 300B. The gate lines 34a and the contact portions 300A and 300B are formed by ink jetting, as described later. The first gate-line connecting portions 34b, as shown in FIG. 1, are electrically connected to the external connection terminals 35 through the gate-line lead 34c.

Source/drain electrodes 30 are disposed on the board 20 under the gate electrodes 34; therefore, the organic thin-film transistors 10a have a top-gate structure.

Referring to FIG. 2B, the source/drain electrodes 30 of the organic thin-film transistors 10a are connected to the source lines 33a. The source lines 33a, which are formed by patterning, as described later, are electrically connected to the external connection terminals 35 through the source-line leads 30c extending from the source lines 33a. Ends of the source lines 33a facing away from the source-line leads 30c are electrically connected to the conduction line 36, which is formed by patterning as well.

In FIG. 1, the conduction line 36 extends so as to connect together the second gate-line connecting portions 34d (see FIG. 2A) disposed on the same surface and are electrically connected to the gate lines 34a through the second gate-line connecting portions 34d and the contact portions 300B connected thereto. In this embodiment, therefore, the conduction line 36 provides electrical connection between the source lines 33a and the gate lines 34a. As a result, the source lines 33a and the gate lines 34a become equipotential, so that no electric field occurs therebetween.

In FIGS. 2A and 2B, a protective film 40 is disposed on the insulating layer 32, and the pixel electrodes 9 are disposed on the protective film 40 and are connected to the source/drain electrodes 30 of the organic thin-film transistors 10a, thus constituting the active-matrix substrate 10.

The conduction line 36 may instead be disposed on the same surface as the gate lines 34a.

Method for Producing Active-Matrix Substrate

Next, a method for forming the conduction line 36 in a process of producing the active-matrix substrate 10 will be described with reference to FIGS. 3A to 3C, 4A to 4C, 5A to 5C, 6A and 6B, and 7, and the individual components of the active-matrix substrate 10 will also be described. FIG. 7 is a plan view, corresponding to FIG. 1, of the active-matrix substrate 10 in the step of FIG. 4A.

FIGS. 3A to 3C, 4A to 4C, 5A to 5C, and 6A and 6B show simplified views of the active-matrix substrate 10; in each figure, the left part shows a side sectional view taken along the gate lines 34a of the active-matrix substrate 10, and the right part shows a side sectional view taken along the source lines 33a of the active-matrix substrate 10.

Step of Forming Conduction Line

Figure 3A:
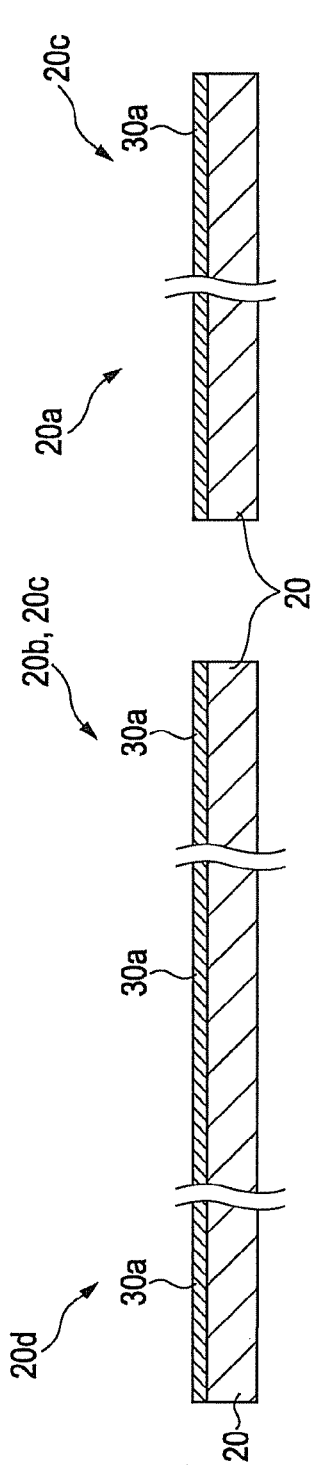
FIG. 3A is a diagram illustrating a step of a method for producing an electrophoretic display according to the first embodiment.

Referring to FIG. 3A, the board 20 is sufficiently cleaned and degassed before an organic conductive film 30a is formed over the entire surface of the board 20 by printing using an organic conductive material. The organic conductive film 30a may be formed of various materials with high conductivity. The organic conductive material used in this embodiment is prepared by, for example, mixing metal powder in an organic resin so that it has conductivity. Examples of the organic resin used include acrylic resin, epoxy resin, polyvinylphenol, poly(vinyl alcohol), and polystyrene.

Figure 3B:
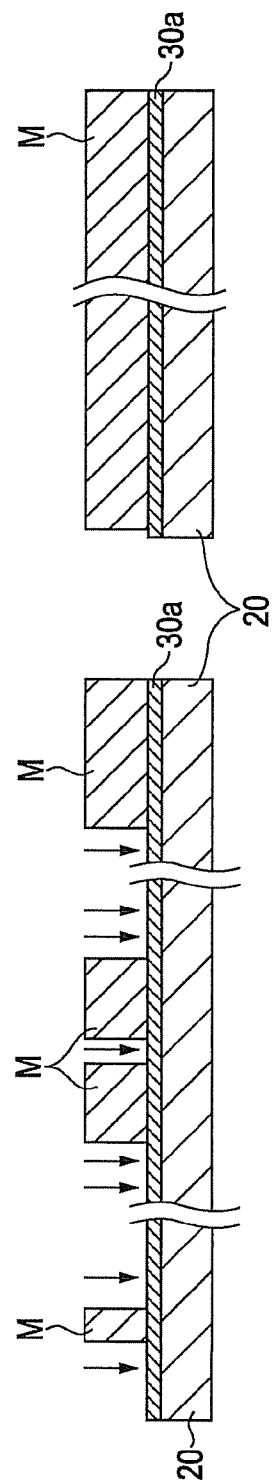
FIG. 3B is a diagram illustrating the same step.

Referring to FIG. 3B, a photoresist is applied to the entire surface of the organic conductive film 30a by spin coating, is cured by heat treatment, and is subjected to exposure and development to form a mask M.

Figure 3C:
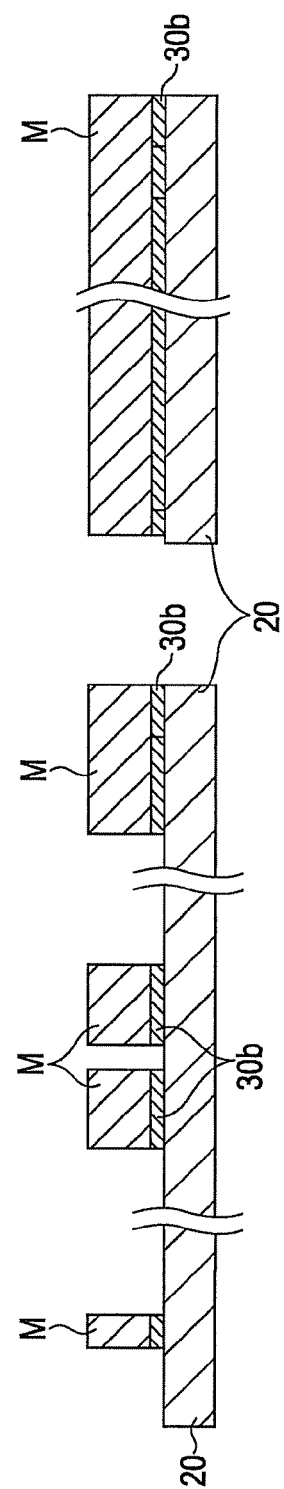
FIG. 3C is a diagram illustrating the same step.

Referring to FIG. 3C, the organic conductive film 30a is etched through the mask M to form an organic conductive film pattern 30b corresponding to the opening pattern of the mask M.

Figure 4A:
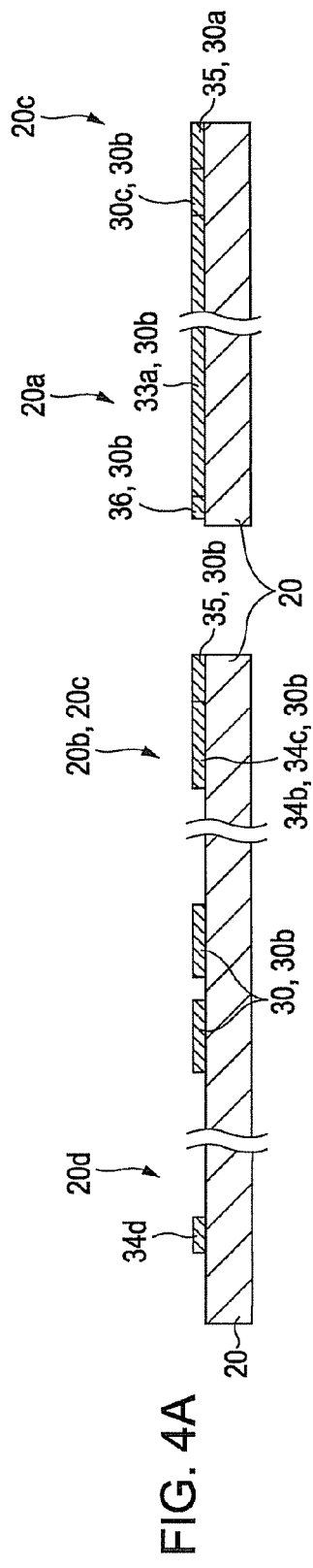
FIG. 4A is a diagram illustrating a step following the step of FIGS. 3A to 3B.

Referring to FIG. 4A, the mask M is removed, so that only the organic conductive film pattern 30b remains on the board 20. The organic conductive film pattern 30b includes the source lines 33a and the conduction line 36. In addition, the organic conductive film pattern 30b includes the source/drain electrodes 30 of the organic thin-film transistors 10a and, as shown in FIG. 7, also includes the first gate-line connecting portions 34b, the second gate-line connecting portions 34d, the gate-line leads 34c, the external connection terminals 35, and the source-line leads 30c.

Step of Forming Semiconductor Layer

Figure 4B:
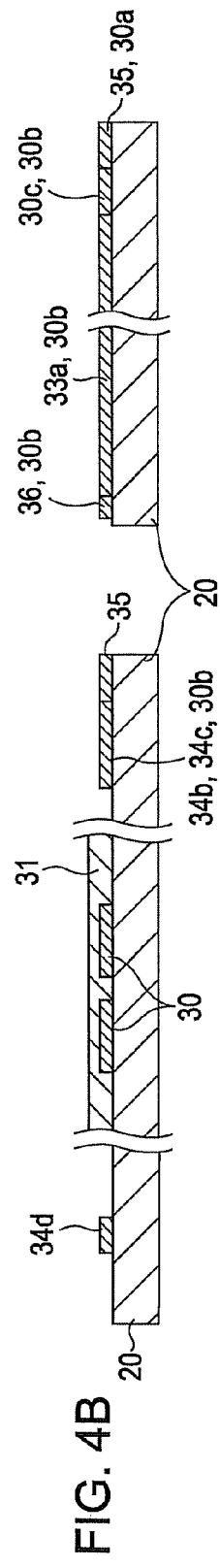
FIG. 4B is a diagram illustrating the same step.

Referring to FIG. 4B, a semiconductor layer 31 is formed over the source/drain electrodes 30 by spin coating. Examples of the material of the semiconductor layer 31 include low-molecular-weight organic semiconductor materials such as naphthalene, anthracene, tetracene, pentacene, hexacene, phthalocyanine, perylene, hydrazone, triphenylmethane, diphenylmethane, stilbene, arylvinyl, pyrazoline, triphenylamine, triarylamine, oligothiophene, and derivatives thereof and polymer organic semiconductor materials such as poly(N-vinylcarbazole), polyvinylpyrene, polyvinylanthracene, polythiophene, polyhexylthiophene, poly(p-phenylene vinylene), poly(thienylene vinylene), polyarylamine, pyrene-formaldehyde resin, ethylcarbazole-formaldehyde resin, fluorene-bithiophene copolymer, fluorene-arylamine copolymer, and derivatives thereof. These materials may be used alone or in a combination of two or more of them. Of these, polymer organic semiconductor materials are preferred.

The semiconductor layer 31 is removed from around the first gate-line connecting portions 34b, the gate-line leads 34c, the conduction line 36, and the source lines 33a by patterning, so that they are separated from the semiconductor layer 31 remaining on the source/drain electrodes 30.

Instead of removing the semiconductor layer 31 by patterning, it may be formed only in a target region by ink jetting, thereby reducing the number of steps.

Step of Forming Insulating Layer

Figure 4C:
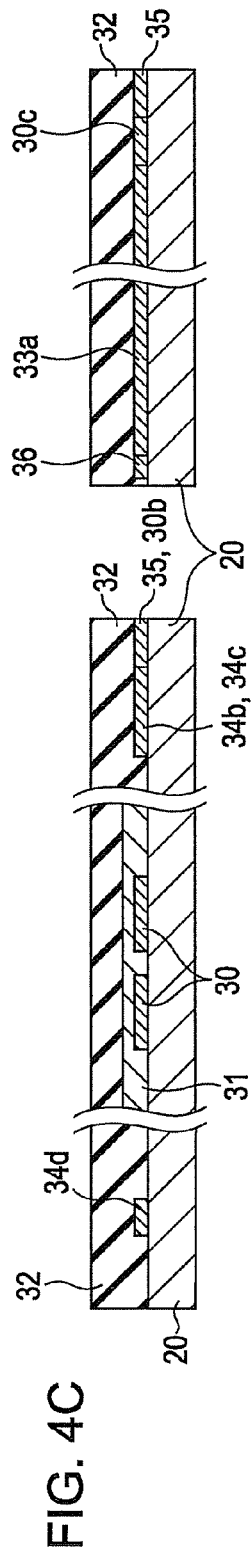
FIG. 4C is a diagram illustrating the same step.

Referring to FIG. 4C, an insulating polymer is applied by spin coating to form the insulating layer 32. The polymer used may be polyvinylphenol or phenolic resin (novolac resin). Other examples include acrylic resins such poly(methyl methacrylate), polycarbonates, polystyrene, polyolefins, poly(vinyl alcohol), polyimides, and fluororesins.

If the insulating layer 32 is formed by applying a solution, it must contain a solvent that does not swell or dissolve the semiconductor layer 31 or the board 20; special attention must be paid if the semiconductor layer 31 itself is soluble in the solvent. The semiconductor layer 31 can readily be dissolved in an aromatic hydrocarbon solvent because the semiconductor layer 31 is formed of a conjugated molecular compound or a conjugated polymer having an aromatic ring. Hence, the insulating layer 32 is preferably formed using a nonaromatic hydrocarbon solvent, an aqueous solvent, or an alcohol solvent.

The insulating layer 32 is preferably insoluble in a liquid material used to form the gate electrodes 34, as described later. Accordingly, an acceptor layer (not shown) is formed on the top of the insulating layer 32 to improve wettability and contact angle to the gate electrodes 34 and the gate lines 34a to be formed in the subsequent process.

The next step is the formation of the contact portions 300A (see FIG. 2A) for providing electrical connection between the gate lines 34a (gate electrodes 34) to be formed on the insulating layer 32 and the first gate-line connecting portions 34b and the contact portions 300B (see FIG. 2A) for providing electrical connection between the gate lines 34a (gate electrodes 34) and the second gate-line connecting portions 34d.

Figure 5A:
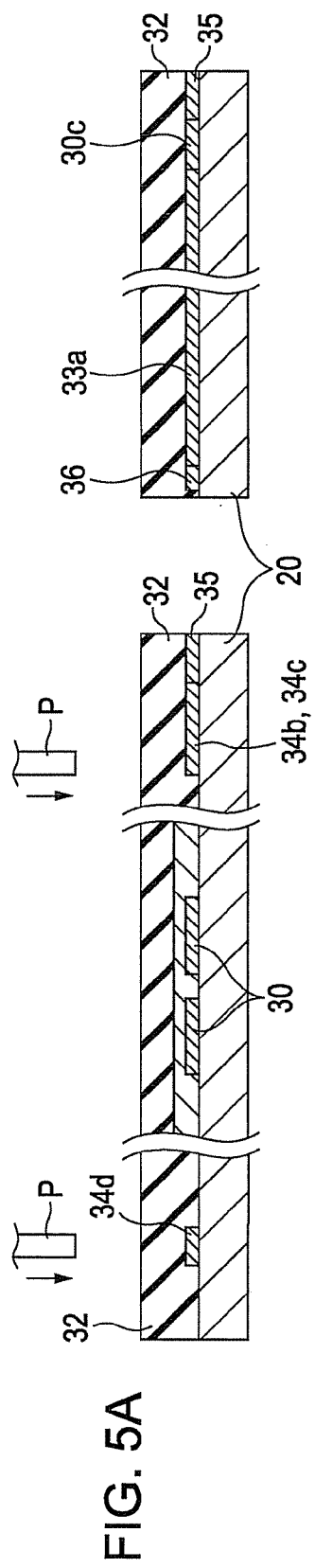
FIG. 5A is a diagram illustrating a step following the step of FIGS. 4A to 4C.
Figure 5B:
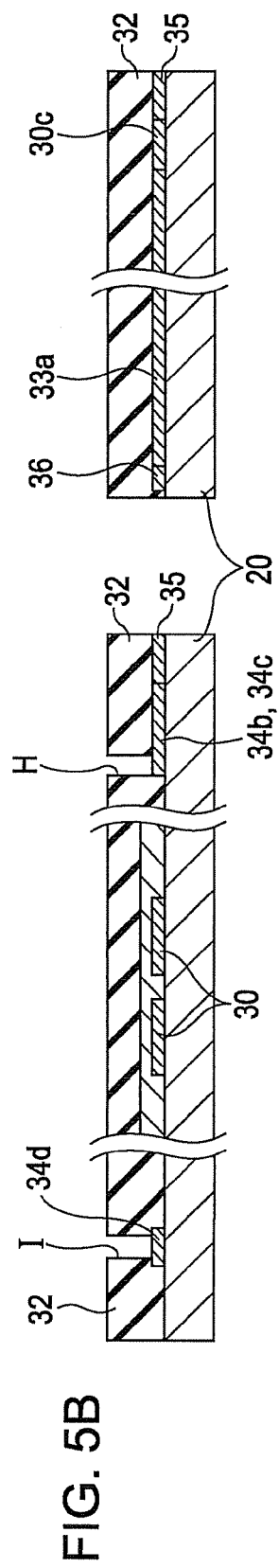
FIG. 5B is a diagram illustrating the same step.

To form the contact portions 300A and 300B, referring to FIG. 5A, fine holes are formed in the insulating layer 32 by, for example, inserting needles P. Referring to FIG. 5B, as a result, the contact holes H and I are formed in the insulating layer 32, reaching the surfaces of the first gate-line connecting portions 34b and the second gate-line connecting portions 34d, respectively.

Figure 5C:
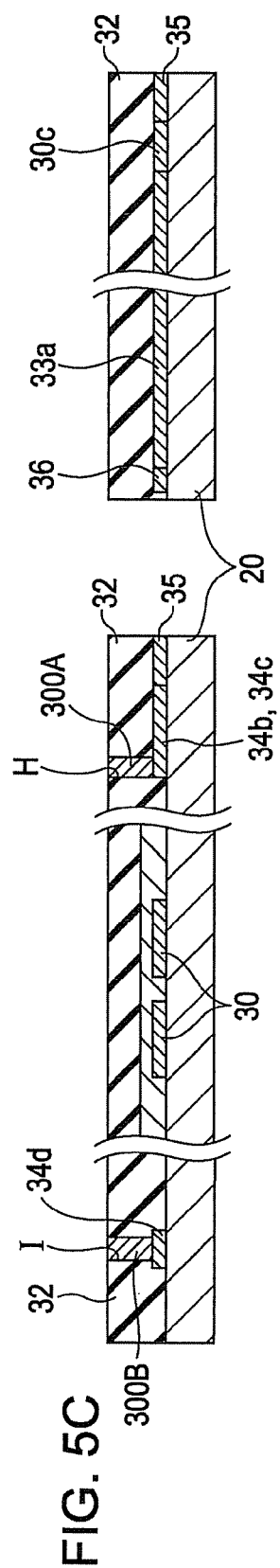
FIG. 5C is a diagram illustrating the same step.

Referring to FIG. 5C, a conductive material is ejected and embedded in the contact holes H and I by ink jetting to form the contact portions 300A and 300B.

The contact portions 300A, formed of a conductive material, can provide electrical connection to the gate-line connecting portions 34b because the contact holes H, in which the contact portions 300A are embedded, reach the surface of the gate-line connecting portions 34b, as described above.

Similarly, the contact portions 300B, formed of a conductive material, can provide electrical connection to the gate-line connecting portions 34d because the contact holes I, in which the contact portions 300B are embedded, reach the surface of the gate-line connecting portions 34d, as described above.

With ink jetting, the conductive material can be ejected to a predetermined position on the insulating layer 32 by driving an ink jet head (not shown) and a movement mechanism (not shown) for relatively moving the ink jet head and the board 20. The liquid material is ejected in a pattern based on electronic data, such as a bitmap pattern, stored in a droplet-ejecting apparatus, so that simply preparing the electronic data enables the application of the liquid material to a target position.

Step of Forming Gate Electrodes

Referring to FIG. 6A, a conductive material is ejected onto the insulating layer 32 by ink jetting to form the gate electrodes 34 such that they overlap portions (channels) between the source/drain electrodes 30, thus constituting the organic thin-film transistors 10a.

The conductive material is successively ejected by ink jetting to form the gate lines 34a for connecting the gate electrodes 34 to the contact portions 300A and 300B. FIG. 6A shows only part of the gate lines 34a; actually, they are connected to the gate electrodes 34.

The gate lines 34a, as shown in FIG. 1, connect the gate electrodes 34 together. When the gate lines 34a are formed by ink jetting, the conductive material is ejected with the ejection head and the board 20 being shifted in one direction relative to each other because the gate lines 34a extend linearly in the X direction.

Referring to FIG. 6B, finally, a polymer solution is applied onto the insulating layer 32 by spin coating to form the protective film 40 over the gate lines 34a and the gate electrodes 34. In addition, the pixel electrodes 9 may be formed on the protective film 40 for the individual organic thin-film transistors 10a (see FIG. 1). If the active-matrix substrate 10 is used for a current-driven device such as an organic EL device, which must be supplied with current, or for a voltage-driven device such as a liquid crystal device, which must be supplied with voltage, the pixel electrodes 9 may be formed on the protective film 40 and may be connected to the organic thin-film transistors 10a through contact portions formed by the steps described above.

After the above process, the active-matrix substrate 10 according to this embodiment is finished.

In the active-matrix substrate 10 according to this embodiment, the conduction line 36 provides electrical connection between the source lines 33a and the gate lines 34a, so that they become equipotential. This prevents dielectric breakdown between the source lines 33a and the gate lines 34a due to static electricity because no potential difference occurs therebetween during the process of producing the active-matrix substrate 10, particularly, in the step of forming the thin-film transistors 10a. The active-matrix substrate 10 can therefore provide a desired function.

Electrooptical Device

Figure 8:
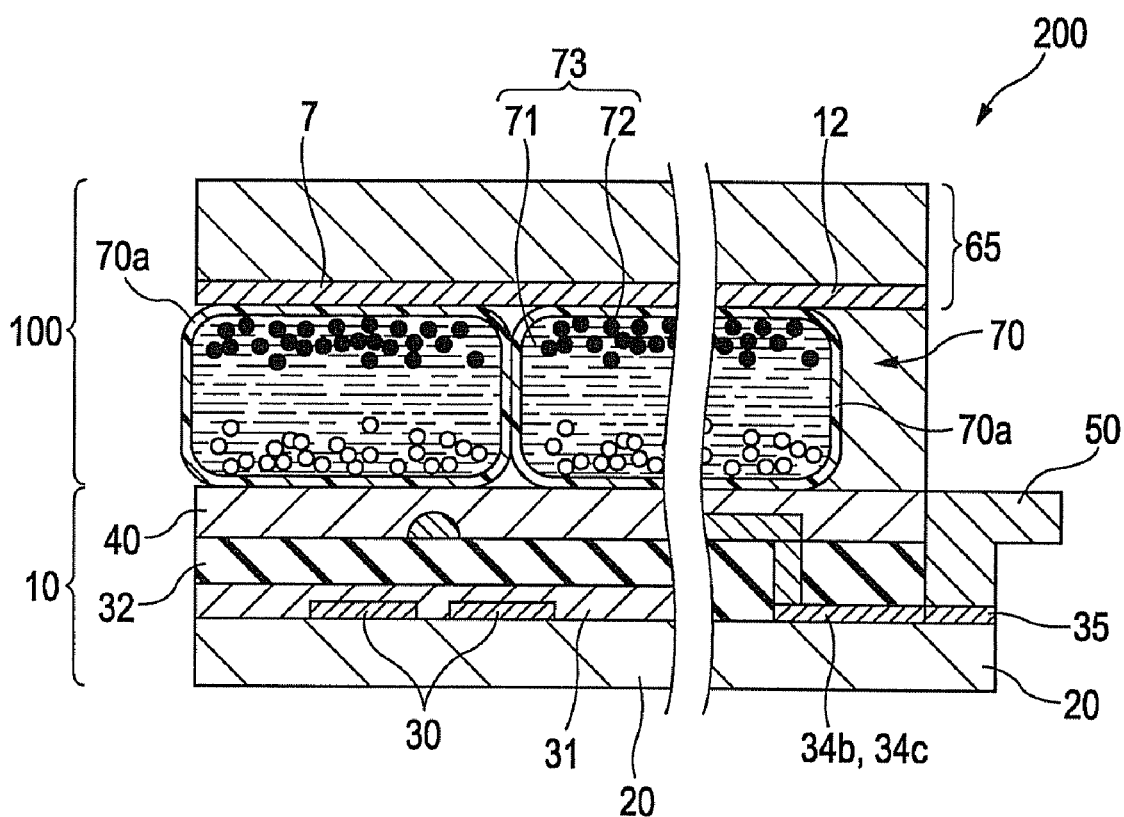
FIG. 8 is a sectional view of an electrophoretic display according to an embodiment of the invention.

FIG. 8 is a sectional view of an electrooptical device according to an embodiment of the invention.

In FIG. 8, an electrophoretic display 200 includes the active-matrix substrate (circuit board) 10, an electrophoretic display unit 100, and a flexible printed circuit (FPC) board connected to the active-matrix substrate 10. The active-matrix substrate 10 used herein is the same as that of the above embodiment.

Electrophoretic Display Unit

In FIG. 8, the electrophoretic display unit 100 includes a counter substrate 65 disposed opposite the active-matrix substrate 10 and an electrophoretic layer 70 disposed between the two substrates 10 and 65.

The counter substrate 65 is disposed so as not to overlap the conduction line 36, which is exposed on the active-matrix substrate 10.

The electrophoretic layer 70 includes microcapsules 70a.

The microcapsules 70a are formed of resin coating, have a size similar to one pixel, and are arranged over the entire display region. The display region is covered with the microcapsules 70a without gaps therebetween because the adjacent microcapsules 70a actually contact each other closely. An electrophoretic dispersion 73 containing, for example, a dispersion medium 71 and electrophoretic particles 72 is sealed in the microcapsules 70a.

Next, the electrophoretic dispersion 73 containing the dispersion medium 71 and the electrophoretic particles 72 will be described. The electrophoretic dispersion 73 is prepared by dispersing the electrophoretic particles 72 in the dispersion medium 71, which is colored with a dye.

The electrophoretic particles 72 are substantially spherical microparticles formed of an inorganic oxide or hydroxide and having a diameter of about 0.01 to 10 μm, and have a different color (including black and white) from the dispersion medium 71. The electrophoretic particles 72, formed of an oxide or a hydroxide, have an intrinsic surface isoelectric point, and their surface charge density (amount of charge) varies with the hydrogen-ion concentration index, namely, pH, of the dispersion medium 71.

The surface isoelectric point herein refers to the state, expressed in pH, where the algebraic sum of the amount of charge of an ampholyte in an aqueous solution is zero. For example, if the pH of the dispersion medium 71 is equal to the surface isoelectric point of the electrophoretic particles 72, the amount of effective charge of the particles 72 is zero, so that they do not respond to an external electric field. If the pH of the dispersion medium 71 is lower than the surface isoelectric point of the particles 72, the surfaces of the particles 72 are positively charged, as represented by the following formula (1):

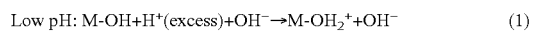

$$\text{Low pH: M-OH} + \text{H}^+(\text{excess}) + \text{OH}^- \rightarrow \text{M-OH}_2^+ + \text{OH}^- \quad (1)$$

Conversely, if the pH of the dispersion medium 71 is higher than the surface isoelectric point of the particles 72, the surfaces of the particles 72 are negatively charged, as represented by the following formula (2):

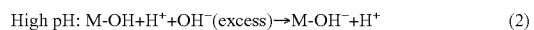

$$\text{High pH: M-OH} + \text{H}^+ + \text{OH}^-(\text{excess}) \rightarrow \text{M-OH}^- + \text{H}^+ \quad (2)$$

According to the reaction formulae (1) and (2), the amount of charge of the particles 72 increases with increasing difference between the pH of the dispersion medium 71 and the surface isoelectric point of the particles 72. The amount of charge, however, becomes substantially saturated after the difference reaches a predetermined level, and therefore no longer increases with any further increase in pH. Although the saturation level depends on, for example, the type, size, and shape of the particles 72, the amount of charge will become substantially saturated with a difference in pH of roughly 1 or more for any type of particles.

The electrophoretic particles 72 may be formed of, for example, titanium dioxide, zinc oxide, magnesium oxide, iron oxide, aluminum oxide, black low-valence titanium oxide, chromium oxide, boehmite, FeOOH, silicon dioxide, magnesium hydroxide, nickel hydroxide, zirconium oxide, or copper oxide.

The electrophoretic particles 72 may be used directly or after surface modification treatment. Examples of the surface modification treatment include coating the surfaces of the particles 72 with a polymer such as acrylic resin, epoxy resin, polyester resin, or polyurethane resin; coupling with a coupling agent such as a silane coupling agent, a titanate coupling agent, an aluminum coupling agent, or a boron coupling agent; and graft polymerization with acrylic monomer, styrene monomer, epoxy monomer, or isocyanate monomer. These treatments may be used alone or in a combination of two or more of them.

The dispersion medium 71 used may be a nonaqueous organic solvent such as a hydrocarbon solvent, a halogenated hydrocarbon solvent, or an ether solvent. The dispersion medium 71 is colored with a dye such as spirit black, oil yellow, oil blue, oil green, valifast blue, Macrolex blue, oil brown, Sudan black, and fast orange, thus having a different color from the electrophoretic particles 72.

In FIG. 8, the FPC board 50 is connected to the external connection terminals 35 of the active-matrix substrate 10.

The FPC board 50 is a circuit board having a drive circuit (not shown) for driving the organic thin-film transistors 10a (see FIG. 2A) of the active-matrix substrate 10. The FPC board 50 drives the organic thin-film transistors 10a by supplying power to the source lines 33a of the active-matrix substrate 10 and drive signals to the gate lines 34a.

The FPC board 50 is connected to the active-matrix substrate 10 with an anisotropic conductive film (ACF) or an anisotropic conductive paste (ACP) after the semiconductor layer 31, the insulating layer 32, and the protective film 40 are removed from around the external connection terminals 35 by photolithography and etching.

Method for Producing Electrooptical Device

Next, a method for producing the electrophoretic display 200, which is an example of an electrooptical device according to this embodiment, will be described with reference to FIGS. 8 and 9.

Step of Assembling Panel

First, the active-matrix substrate 10 produced by the method described above and the counter substrate 65 to be disposed opposite the active-matrix substrate 10 are prepared. A common electrode 7 is formed over the entire inner surface of the counter substrate 65 using indium tin oxide (ITO) by, for example, vapor deposition.

Numerous microcapsules 70a are deposited on the surface of the common electrode 7 on the counter substrate 65 using a binder by, for example, ink jetting.

Step of Breaking Electrical connection

Figure 9:
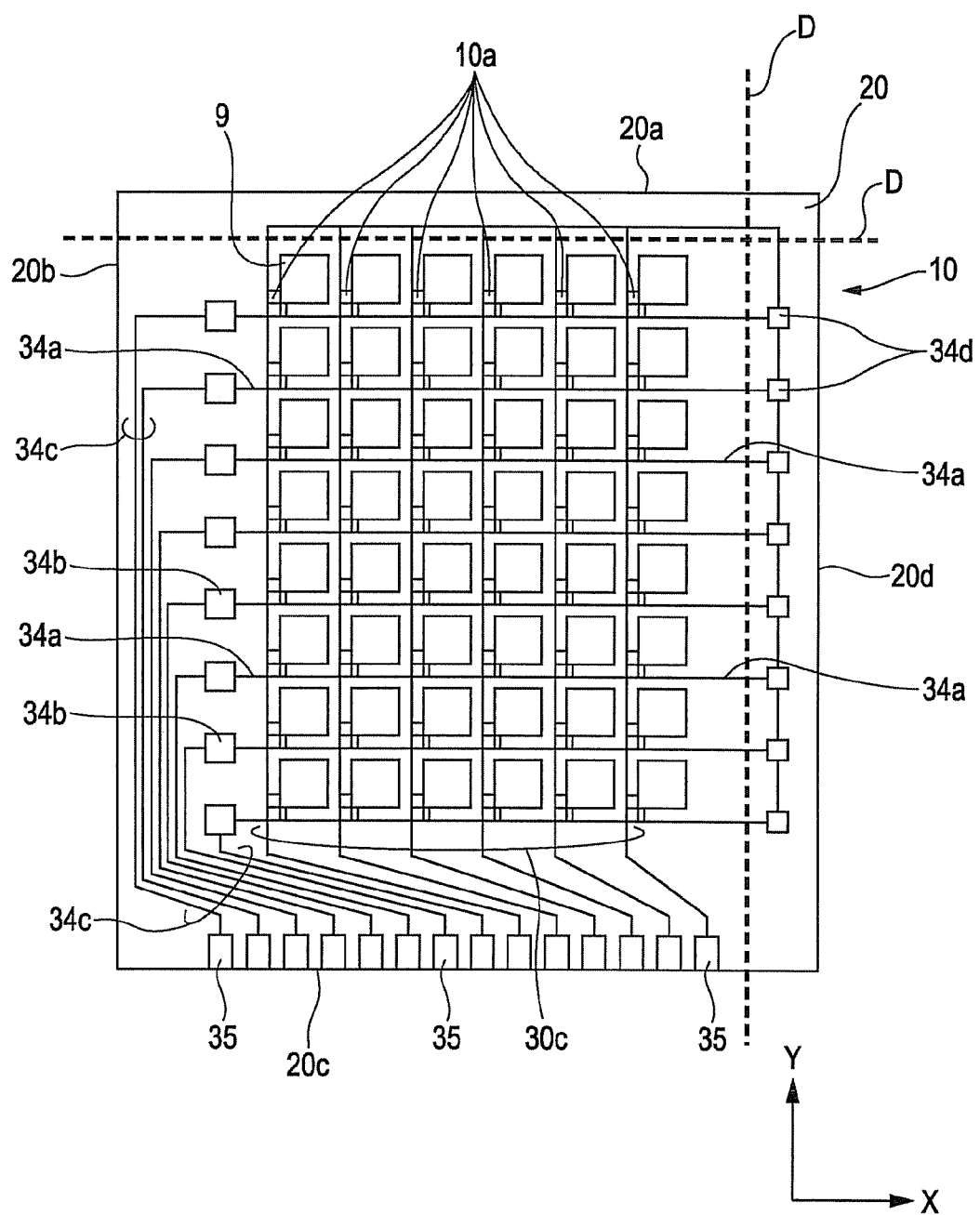
FIG. 9 is a plan view showing dicing lines in a step of breaking electrical connection.

Referring to FIG. 9, the electrical connection between the gate lines 34a and the source lines 33a of the active-matrix substrate 10 is broken. This can be achieved by removing or modifying at least part of the conduction line 36 so that no electrical connection is made between the gate lines 34a and the source lines 33a.

Examples of the method for breaking the electrical connection between the gate lines 34a and the source lines 33a include (1) removing at least part of the conduction line 36 by dissolving it in an organic solvent (chemical); (2) eliminating conductivity by modifying at least part of the conduction line 36 (chemical); (3) mechanically removing at least part of the conduction line 36 (single layer) using a tool such as a needle, a cutter, or a brush (physical); and (4) completely removing the conduction line 36 by cutting the substrate 10 (physical).

Thus, any of the above methods (1) to (4) may be used to break the electrical connection between the gate lines 34a and the source lines 33a.

In the method (1), the conduction line 36, formed of an organic conductive material, is chemically removed using an organic solvent. In this case, the peripheral regions 20a and 20d of the active-matrix substrate 10, in which the conduction line 36 has been formed, can be dipped in an organic solvent contained in a container such as a tank. In terms of its effect on the other wiring lines and components, however, it is preferable to dissolve and remove at least part of the conduction line 36 from the active-matrix substrate 10 by etching using the organic solvent as an etchant. Because the conduction line 36 is formed of an organic conductive material soluble in an organic solvent, as described above, the electrical connection between the source lines 33a and the gate lines 34a can be readily and reliably broken without damage to the board 20.

The type of organic solvent will now be described.

If the organic conductive material is acrylic resin, the solvent used may be an ester solvent, such as ethyl acetate, or a ketone solvent, such as acetone.

If the organic conductive material is epoxy resin, the solvent used may be, for example, butyl acrylate, acetone, aniline, isopropyl alcohol, ethanol, ethyl chloride, benzyl chloride, a chlorinated solvent, formic acid, chloroacetone, chlorotoluene, acetic acid, amyl acetate, isopropyl acetate, ethyl acetate, cellosolve acetate, butyl acetate, propyl acetate, methyl acetate, diisopropyl ketone, diethyl ether, cyclohexane, dichlorobenzene, dibutyl ether, dibenzyl ether, dimethylformaldehyde, tetrahydrofuran, trichloroethylene, ethylene dichloride, nitrobenzene, phenol, fluorobenzene, acetic anhydride, methyl methacrylate, methanol, methyl isobutyl ketone, methyl ethyl ketone, monochloroacetic acid, or monochlorobenzene.

If the organic conductive material is polyvinylphenol or poly(vinyl alcohol), the solvent used may be an aqueous or alcohol solvent.

If the organic conductive material is polystyrene, the solvent used may be, for example, diisopropyl ketone, carbon tetrachloride, cyclohexane, cyclohexanone, dimethylformamide, tetrahydrofuran, tetrachloroethane, tetrachloroethylene, toluene, a nitrated solvent, benzene, methyl methacrylate, methyl ethyl ketone, or monochlorobenzene.

Such types of organic solvents as described above can be used alone or in a combination of two or more of them.

In the method (2), the conduction line 36 is modified by oxidation reaction. If the conduction line 36, formed of the organic conductive material described above, is oxidized with a strong acid such as hydrochloric acid, sulfuric acid, or nitric acid, an oxidized portion of the polymer is decomposed and degraded, thus virtually losing conductivity. The polymer may also be subjected to ring-opening and oxidation reaction by irradiation with light (visible light or ultraviolet light), thus losing conductivity. This method leaves the conduction line 36 on the board 20 without changing its wiring pattern. That is, the conduction line 36 remains on the board 20 apparently as a connective portion connective the gate lines 34a and the source lines 33a together, although they are electrically separated because, as described above, the modified portion has lost conductivity and functions as an insulator.

Using the chemical methods (1) and (2) described above, the electrical connection between the source lines 33a and the gate lines 34a can be broken without damage to the board 20.

In the method (3), the conduction line 36 is removed from the active-matrix substrate 10 by cutting it using a tool such as a needle, a cutter, or a brush. This allows a known method to be directly used, so that the conduction line 36 can readily be partially or completely removed without the need for an additional removing apparatus.

In the method (4), as shown in FIG. 9, for example, the active-matrix substrate 10 is cut along dicing lines D parallel to the peripheral regions 20a and 20d to mechanically (physically) remove the conduction line 36 together with other organic materials. Cutting off the conduction line 36 together with the board 20 allows the conduction line 36 to be reliably disconnected from the source lines 33a and the gate lines 34a.

If the conduction line 36 is removed by a physical method such as the method (3) or (4), it may be formed of an inorganic conductive material.

Next, the counter substrate 65 having the microcapsules 70a is disposed opposite the active-matrix substrate 10, on which the electrical connection between the gate lines 34a and the source lines 33a has been broken. The counter substrate 65 and the active-matrix substrate 10 are laminated together by bringing the common electrode 12 side of the counter substrate 65 into contact with the pixel electrode 9 (not shown in FIG. 8) side of the active-matrix substrate 10. Thus, a display panel having the electrophoretic layer 70 held between the active-matrix substrate 10 and the counter substrate 65 is assembled.

In the method for producing the electrophoretic display 200 according to this embodiment, the display panel is assembled by laminating the active-matrix substrate 10 and the counter substrate 65 with the electrophoretic layer 70 disposed therebetween after the step of breaking the electrical connection between the gate lines 34a and the source lines 33a of the active-matrix substrate 10. If the electrical connection between the gate lines 34a and the source lines 33a is broken before the assembly step, they can be electrically separated with reliability and ease of operation. Thus, a highly reliable electrophoretic display can be produced using the active-matrix substrate 10, which does not cause dielectric breakdown due to static electricity.

Although the step of breaking the electrical connection between the gate lines 34a and the source lines 33a is performed before the assembly of the display panel in the above embodiment, it is also possible to perform the step of laminating the active-matrix substrate 10 and the counter substrate 65 with the electrophoretic layer 70 disposed therebetween before readily and reliably breaking the electrical connection between the gate lines 34a and the source lines 33a. While static electricity acquired during a known production process may cause dielectric breakdown between the source lines 33a and the gate lines 34a, the conduction line 36 allows the source lines 33a and the gate lines 34a to be equipotential during the assembly step. This reliably avoids damage to the organic thin-film transistors 10a, which have low resistance to static electricity. The step of readily and reliably breaking the electrical connection between the gate lines 34a and the source lines 33a can be performed after the assembly of the display panel without the risk of breakdown due to static electricity, so that they are electrically separated and can therefore be supplied with different signals. Accordingly, the electrophoretic display 200 can provide a high-quality image without pixel defects. To reliably avoid the effect of static electricity, preferably, the step of breaking the electrical connection is performed as later as possible in the production process.

If the conduction line 36 is partially removed, as described above, it remains partially on the active-matrix substrate 10, with the removed portions functioning as breaking portions (not shown) that break the electrical connection between the gate lines 34a and the source lines 33a. Thus, the conduction line 36 does not have to be completely removed to break the electrical connection between the gate lines 34a and the source lines 33a, but predetermined portions of the conduction line 36 corresponding to the gate lines 34a and the source lines 33a may be removed to break the electrical connection between the conduction line 36 and the gate lines 34a and the source lines 33a. This allows the electrical connection between the gate lines 34a and the source lines 33a to be broken, so that they are electrically separated.

Although the method for breaking the electrical connection between the gate lines 34a and the source lines 33a by removing at least part of the conduction line 36 has been described above, the electrical connection may also be broken by removing part of the gate lines 34a and the source lines 33a (part of the ends connected to the conduction line 36) so that they are disconnected from the conduction line 36.

Although the step of breaking the electrical connection is performed before the counter substrate 65 is laminated on the active-matrix substrate 10 in the above embodiment, the step of breaking the electrical connection may be performed at any timing, depending on the structure of the electrooptical device.

Second Embodiment

A method for producing an electrooptical device according to a second embodiment of the invention will now be described.

Figure 10:
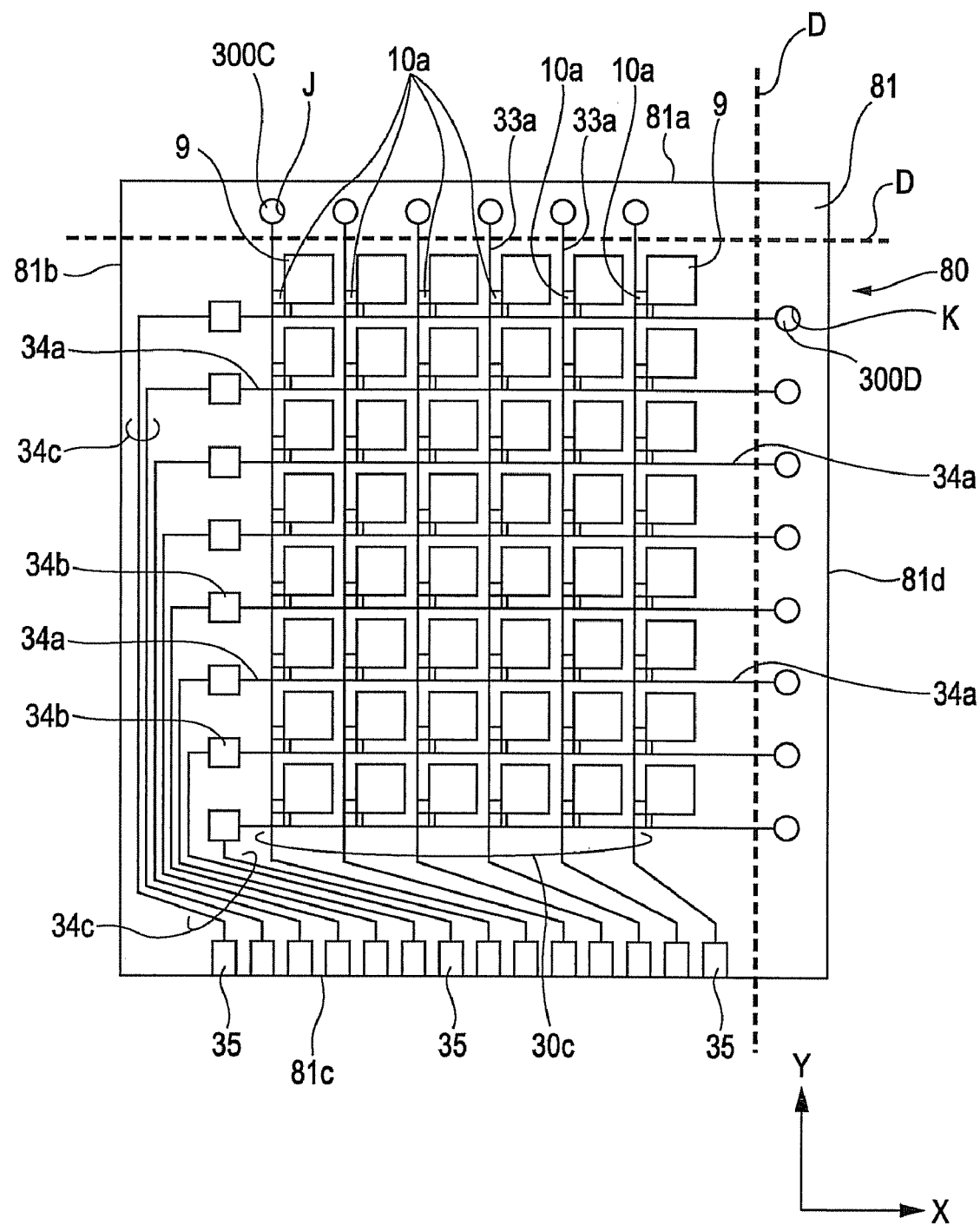
FIG. 10 is a plan view of an active-matrix substrate according to a second embodiment of the invention.
Figure 11A:
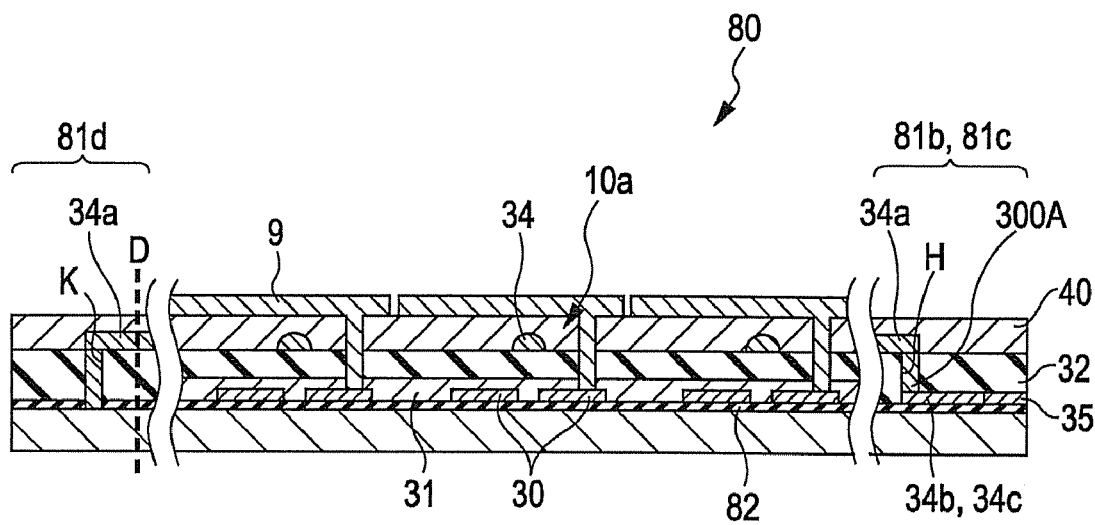
FIG. 11A is a sectional view taken along a gate line shown in FIG. 10.

FIG. 10 is a schematic plan view of an active-matrix substrate according to this embodiment. FIG. 11A is a sectional view taken along a gate line shown in FIG. 10, and FIG. 11B is a sectional view taken along a source line shown in FIG. 10.

An active-matrix substrate 80 according to this embodiment is substantially the same as that of the first embodiment except that it includes a conductive board. In this embodiment, the active-matrix substrate 80 includes a flexible metal board 81 functioning as a conduction portion for providing electrical connection between the source lines 33a and the gate lines 34a.

Hence, only a specific structure in which the conductive board 81 provides electrical connection between the source lines 33a and the gate lines 34a and a step of breaking the electrical connection between the source lines 33a and the gate lines 34a for this structure will be described, and the common portions will not be described.

Figure 11B:
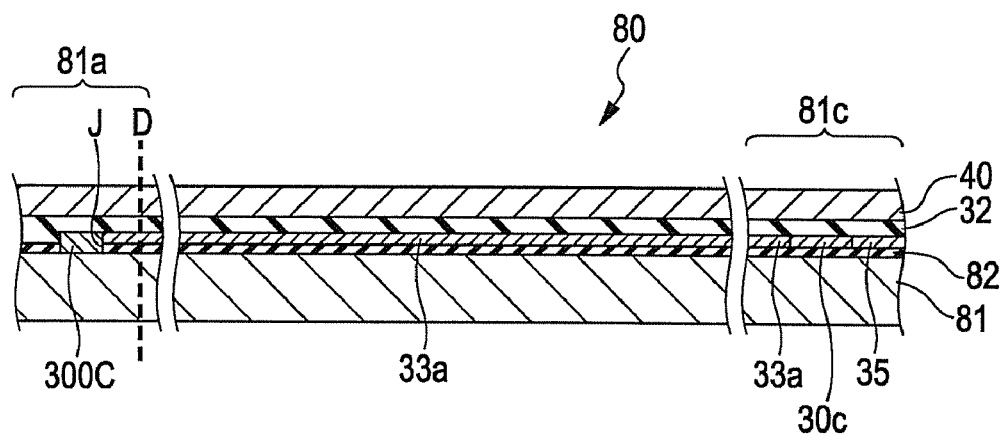
FIG. 11B is a sectional view taken along a source line shown in FIG. 10.

Referring to FIGS. 11A and 11B, the active-matrix substrate 80 according to this embodiment includes the conductive board 81, an insulating layer 82 on the conductive board 81, and the organic thin-film transistors 10a, the source lines 33a, the gate lines 34a, and the pixel electrodes 9 above the insulating layer 82. The insulating layer 82 has contact holes K in which a conductive material is embedded to form contact portions 300D (see FIG. 11A) and contact holes J in which a conductive material is embedded to form contact portions 300C (see FIG. 11B).

Referring to FIG. 10, the contact portions 300C are arranged in a peripheral region 81a of the board 81 and are connected to ends of the source lines 33a opposite those on the external connection terminal 35 side. The contact portions 300D are arranged in a peripheral region 81d of the board 81 and are connected to ends of the gate lines 34a opposite those on the external connection terminal 35 side.

Thus, the gate lines 34a (gate electrodes 34) are connected to the board 81 through the contact portions 300D, and the source lines 33a are connected to the board 81 through the contact portions 300C. Because the board 81 used in this embodiment is formed of a conductive material, as described above, it provides electrical connection between the gate lines 34a and the source lines 33a. In this embodiment, therefore, the active-matrix substrate 80 allows the source lines 33a and the gate lines 34a to be equipotential, thus preventing dielectric breakdown due to static electricity.

When an electrophoretic display is produced using the active-matrix substrate 80 according to this embodiment, the contact portions 300C and 300D are physically removed by cutting the board 81 in the step of breaking the electrical connection between the source lines 33a and the gate lines 34a after the display panel is assembled as in the panel assembly step described above. Specifically, as shown in FIG. 10, the board 81 is cut along the dicing lines D parallel to the peripheral regions 81a and 81d to remove the contact portions 300C and 300D together with other organic materials. As a result, the source lines 33a and the gate lines 34a are disconnected from the board 81, and the electrical connection between the source lines 33a and the gate lines 34a is broken accordingly. To reliably remove the contact portions 300C and 300D, the dicing lines D are set to be closer to the center of the board 81 than the contact portions 300C and 300D.

The active-matrix substrate 80 according to this embodiment, including the conductive board 81, does not require wiring, for example, for providing electrical connection between the source lines 33a and the gate lines 34a on the board 81. This reduces the number of production steps and the thickness of the active-matrix substrate 80.

The conductive board 81 used may be a thin metal film. In addition, although the contact portions 300C and 300D are disposed at the ends of the source lines 33a and the gate lines 34a, respectively, in this embodiment, they may be disposed at any positions on the source lines 33a and the gate lines 34a.

Third Embodiment

A method for producing an electrooptical device according to a third embodiment of the invention will now be described.

In general, small display panels are occasionally produced by preparing a large panel (mother panel) having a plurality of panel-corresponding regions and dividing it into a plurality of display panels. In this embodiment, the wiring pattern formed on the active-matrix substrate 80 according to the first embodiment, for example, is repeated on a mother panel in two orthogonal directions, and electrophoretic displays are produced by cutting the mother panel along dicing lines.

This embodiment is characterized in that the electrical connection between the source lines 33a and the gate lines 34a is broken at the same time as the cutting of the mother panel.

Figure 12:
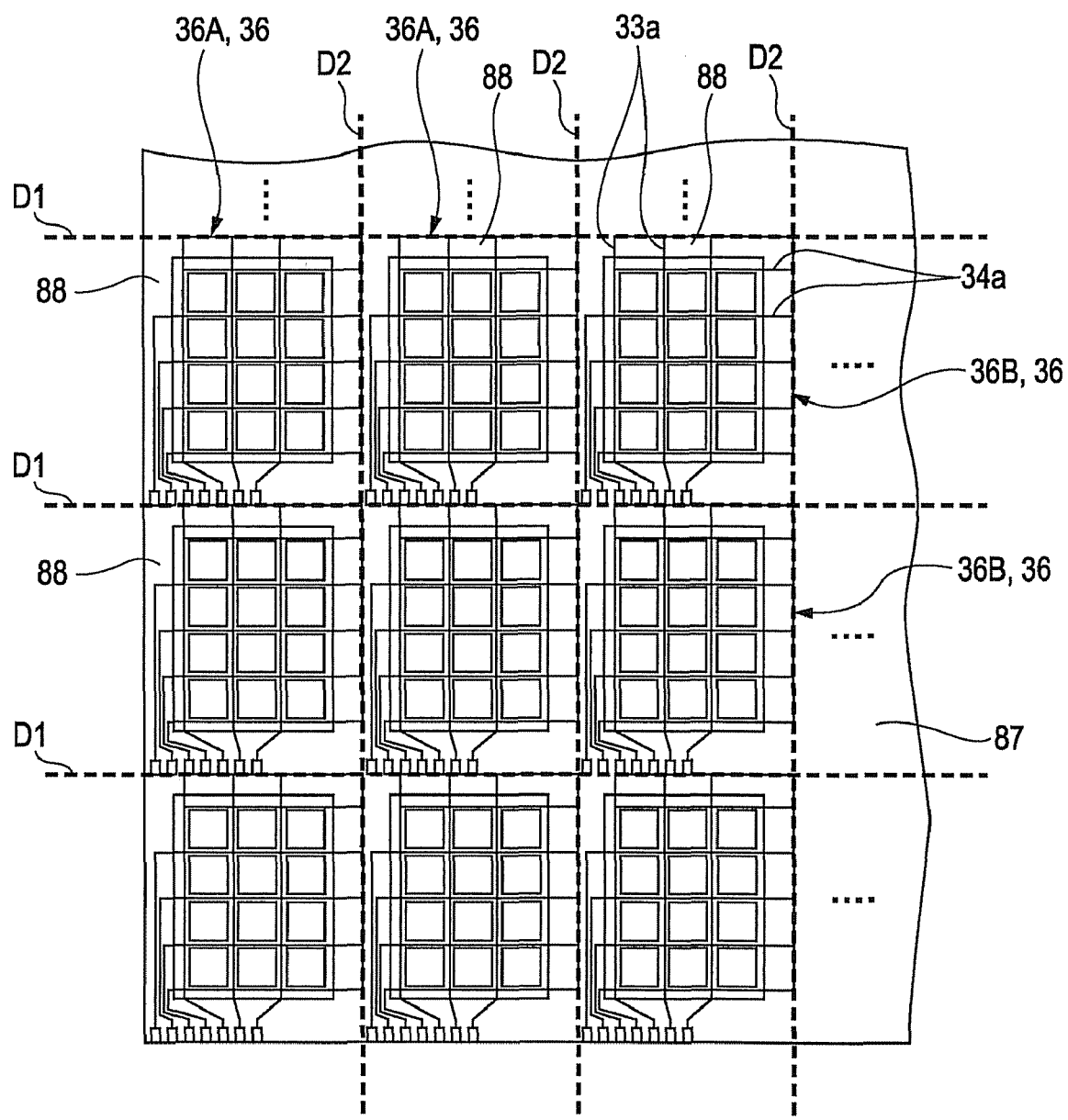
FIG. 12 is a plan view of a mother panel according to a third embodiment of the invention.

Referring to FIG. 12, for example, conduction lines 36 in provisional panel regions 88 of a mother panel 87 are set to dicing lines D1 and D2. The provisional panel regions 88, arranged side by side on the mother panel 87, have the same wiring pattern, so that they constitute a wiring configuration in which line portions 36A and 36B of the conduction lines 36 are aligned in two orthogonal directions. Thus, setting the line portions 36A and 36B in the provisional panel regions 88 to the dicing lines D1 and D2 allows the electrical connection between the source lines 33a and the gate lines 34a to be broken at the same time as the cutting of the mother panel 87.

Thus, simultaneously performing the cutting of the mother panel 87 and the disconnection of the conduction lines 36 reduces the number of operational steps for higher yield and reliably prevents electrostatic damage to the mother panel 87 before the step of cutting the mother panel 87. The electrophoretic display thus produced can provide a high-quality image without pixel defects.

Figure 13:
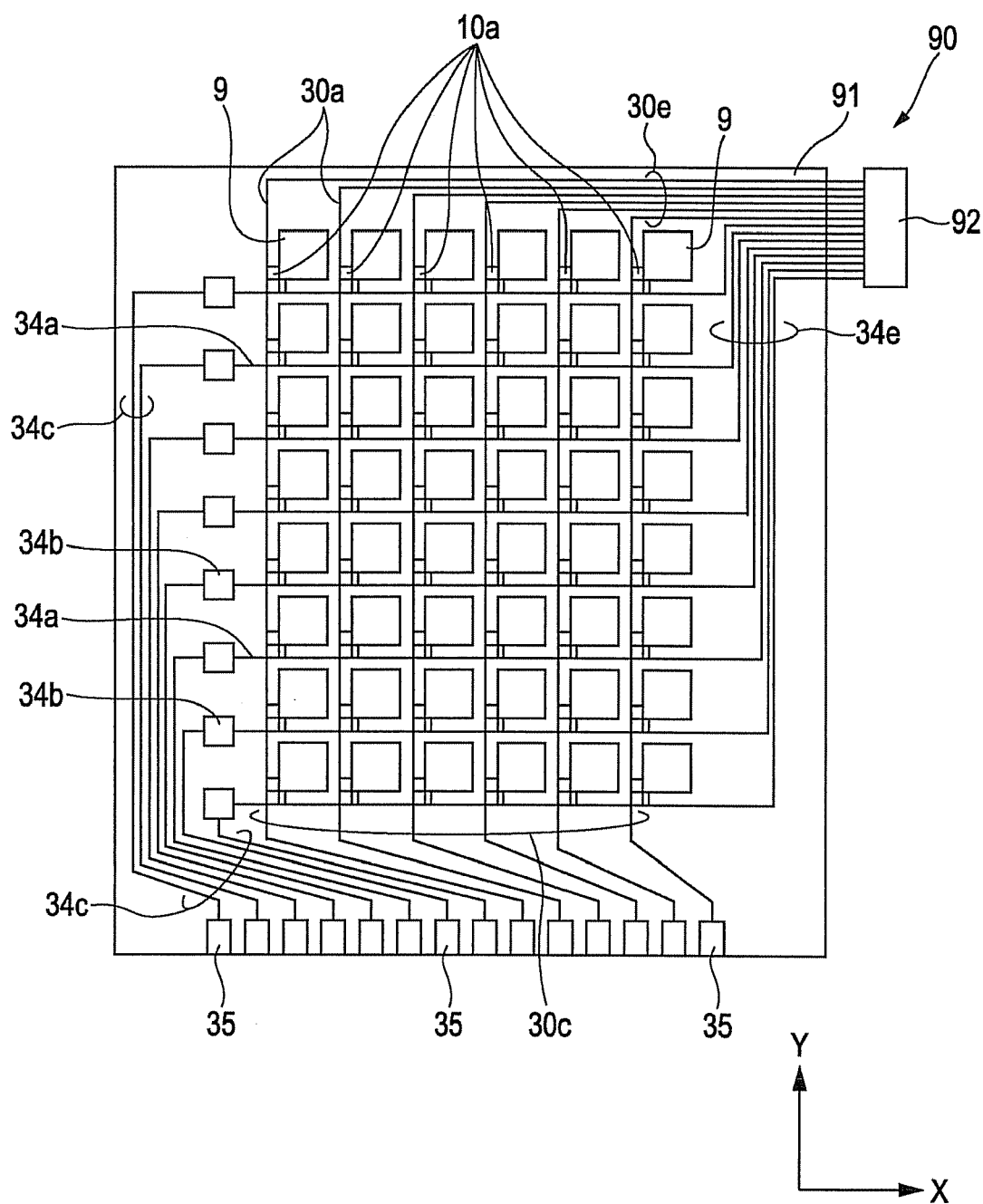
FIG. 13 is a plan view of an active-matrix substrate according to another embodiment of the invention.

In addition, an active-matrix substrate 90 shown in FIG. 13 may be prepared, including different leads extending from the source lines 33a and the gate lines 34a in addition to the gate-line leads 34c and the source-line leads 30c connected to the external connection terminals 35. The active-matrix substrate 90 include gate-line leads 34e extending from ends of the gate lines 34a facing away from the gate-line leads 34c and source-line leads 30e extending from ends of the source lines 33a facing away from the source-line leads 30c. The gate-line leads 34e extending from the gate lines 34a and the source-line leads 30e extending from the source lines 33a may all be integrated and short-circuited at one site on a board 91 so that the gate lines 34a and the source lines 33a become equipotential. In this case, higher yield and throughput can be achieved because only the integrated portions are disconnected by chemical or physical treatment.

The electrical connection between the gate lines 34a and the source lines 33a may also be broken by providing an integrating portion (conduction portion) 92 that integrates ends of the gate-line leads 34c and the source-line leads 30c extending from the board 91 and cutting off the integrating portion 92 from the board 91.

Although the conduction line 36 is formed of the same material (organic conductive material) as the source lines 33a in the above embodiments, it is also possible to form the conduction line 36 using an organic conductive material and the other wiring lines, including the source lines 33a, using a metal, as in the known art.

Although the preferred embodiments of the invention have been described with reference to the attached drawings, the embodiments should not be construed as limiting the invention, and they may also be combined. It is obvious for those skilled in the art that various modifications and alterations are permitted within the technical scope of the claims and of course belong to the technical scope of the invention.

Electronic Apparatus

The above electrophoretic displays are applied to various electronic apparatuses including display units. Examples of electronic apparatuses including the above electrophoretic displays will now be described with reference to FIGS. 14 and 15.

Figure 14:
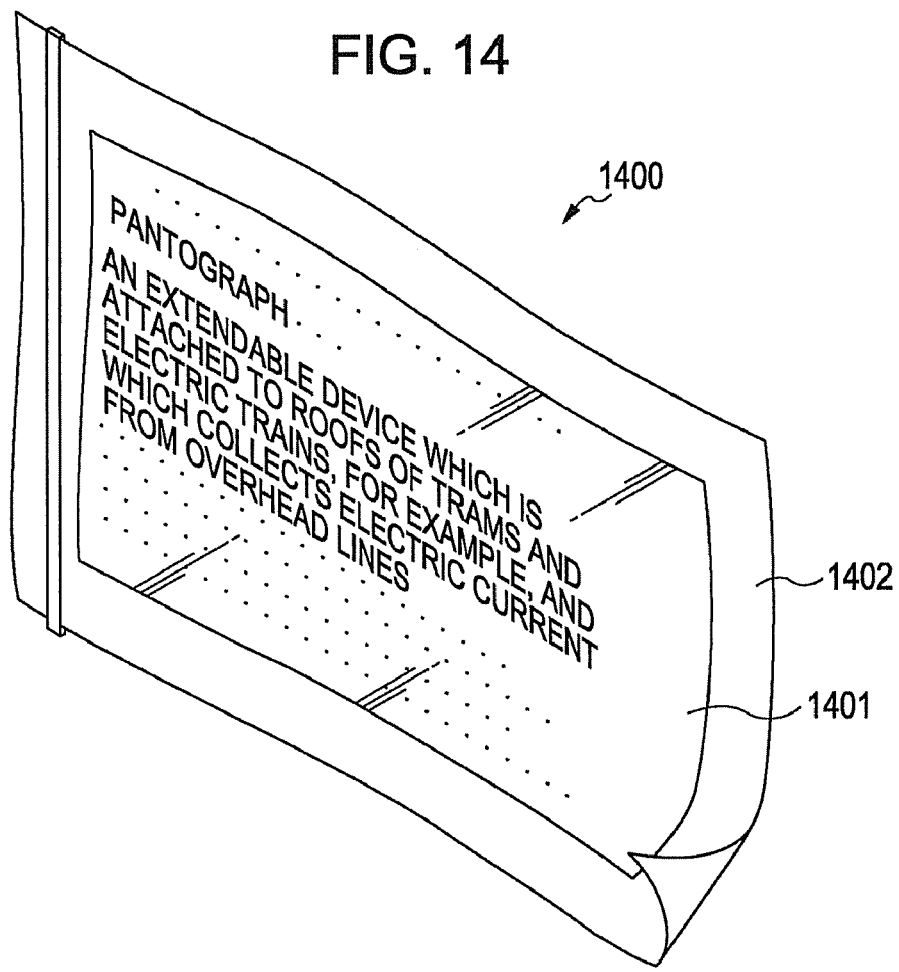
FIG. 14 is a schematic diagram of an example of an electronic apparatus.

First, an example of application of an electrophoretic display to flexible electronic paper will be described. FIG. 14 is a perspective view of the electronic paper. In FIG. 14, electronic paper 1400 includes an electrophoretic display according to an embodiment of the invention as a display unit 1401 and also includes a main body 1402 composed of a rewritable sheet with appearance and flexibility similar to those of normal paper.

Figure 15:
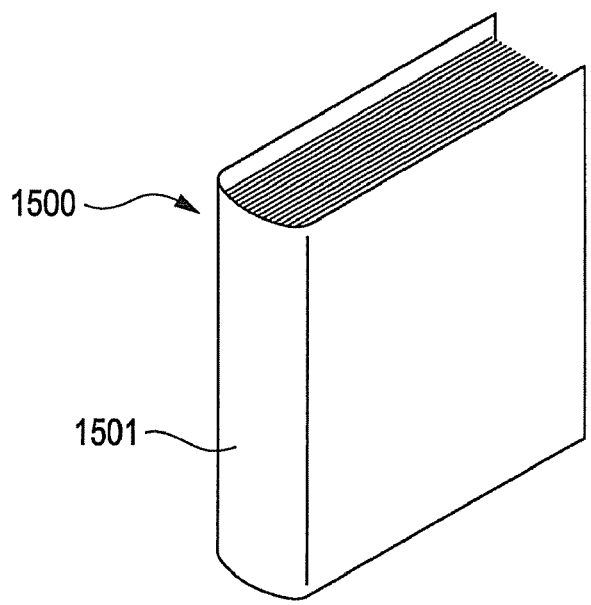
FIG. 15 is a schematic diagram of another example of an electronic apparatus.

FIG. 15 is a perspective view of an electronic notebook. In FIG. 15, an electronic notebook 1500 includes a stack of the electronic paper 1400 shown in FIG. 14 and a cover 1501 holding the electronic paper 1400. The cover 1501 includes, for example, a display-data inputting unit (not shown) for inputting display data supplied from an external apparatus. The electronic paper 1400 can change or update its display content based on the display data without being unfolded.

Other examples include liquid crystal television sets, camcorders with viewfinders or monitors, car navigation systems, pagers, electronic organizers, calculators, word processors, work stations, video phones, POS terminals, and devices with touch panels. Electrooptical devices according to embodiments of the invention are suitable for use as display units of such electronic apparatuses.

What is claimed is:

1. A method for producing an active-matrix substrate including a board, pixels, thin-film transistors that switch the pixels, and source lines and gate lines electrically connected to the thin-film transistors, the method comprising:

forming a conduction portion that provides electrical connection between the source lines and the gate lines using an organic conductive material at the same time as forming either the source lines or the gate lines; and breaking the electrical connection provided by the conduction portion by chemically converting a portion of the organic conductive material from a conductor into an insulator, wherein the portion of the organic conductive material is chemically converted from the conductor into the insulator by oxidation with a strong acid to decompose and degrade the organic conductive material.

2. The method according to claim 1, wherein the conduction portion is formed by printing.

3. An active-matrix substrate comprising:

a board;
   pixels;
   thin-film transistors that switch the pixels;
   source lines and gate lines electrically connected to the thin-film transistors; and
   a connective portion that couples the source lines and the gate lines together, a portion of material of the connective portion being chemically converted from a conductor into an insulator, wherein the connective portion is formed using an organic conductive material, and wherein the portion of the organic conductive material is chemically converted from a conductor into an insulator by oxidation with a strong acid to decompose and degrade the organic conductive material.

4. The active-matrix substrate according to claim 3 further comprising:

an insulating layer on the board;
   wherein the pixels are located on the insulating layer;
   wherein the source lines and gate lines are disposed on the insulating layer; and
   wherein the connective portion is disposed in the insulating layer.

5. An electrooptical device comprising a display element including the active-matrix substrate according to claim 3, a counter substrate, and an electrooptical material disposed therebetween.

6. An electronic apparatus comprising the electrooptical device according to claim 5.

* * * * *